United States Patent
Rapp et al.

(10) Patent No.: US 9,423,147 B2
(45) Date of Patent: Aug. 23, 2016

(54) MIXER FOR MIXING AIR FLOWS

(71) Applicant: MAHLE International GmbH, Stuttgart (DE)

(72) Inventors: Joachim Rapp, Stuttgart (DE); Genis Radressa, Stuttgart (DE)

(73) Assignee: MAHLE International GmbH, Stuttgart (DE)

(*) Notice: Subject to any disclaimer, the term of this patent is extended or adjusted under 35 U.S.C. 154(b) by 12 days.

(21) Appl. No.: 14/141,951

(22) Filed: Dec. 27, 2013

(65) Prior Publication Data

US 2014/0113543 A1 Apr. 24, 2014

Related U.S. Application Data

(63) Continuation of application No. PCT/EP2012/062473, filed on Jun. 27, 2012.

(30) Foreign Application Priority Data

Jun. 28, 2011 (DE) .......................... 10 2011 078 248

(51) Int. Cl.
*F24F 13/04* (2006.01)
*F24F 13/14* (2006.01)
*B60H 1/00* (2006.01)

(52) U.S. Cl.
CPC ............ *F24F 13/04* (2013.01); *B60H 1/00035* (2013.01); *B60H 2001/00092* (2013.01); *F24F 2221/34* (2013.01)

(58) Field of Classification Search
CPC ....................................... F24F 13/04
USPC .......................... 454/156, 261, 265
See application file for complete search history.

(56) References Cited

U.S. PATENT DOCUMENTS

| 2,400,617 | A | * | 5/1946 | Wheller | 454/266 |
| 5,368,521 | A | * | 11/1994 | Koenig | 454/261 |
| 5,463,967 | A | * | 11/1995 | Gielow et al. | 110/104 R |
| 5,988,263 | A | * | 11/1999 | Schwarz | 165/41 |
| 6,007,421 | A | * | 12/1999 | Schwarz | 454/156 |
| 6,106,386 | A | * | 8/2000 | Schwarz | 454/143 |
| 6,139,425 | A | * | 10/2000 | Yazici et al. | 454/261 |
| 7,708,055 | B2 | * | 5/2010 | Koukouravas | 165/204 |
| 8,376,819 | B2 | * | 2/2013 | Vincent et al. | 454/156 |

(Continued)

FOREIGN PATENT DOCUMENTS

| DE | 198 81 087 T1 | 9/1999 |
| DE | 101 56 883 A1 | 5/2003 |

(Continued)

*Primary Examiner* — Steven B McAllister
*Assistant Examiner* — Jonathan Cotov
(74) *Attorney, Agent, or Firm* — Muncy, Geissler, Olds & Lowe, P.C.

(57) ABSTRACT

A mixer for mixing air flows is provided that can include an air duct, which has at least one hot air duct and one cold air duct, wherein an air flow through the hot air duct and through the cold air duct can be controlled by a respective mixing flap. A heating element is arranged in the hot air duct in order to heat the air passing through the hot air duct. Furthermore, the mixer can include a mixing chamber, which is connected to an air outlet side of the hot air duct and of the cold air duct of the air duct such as to enable fluid flow. The mixing chamber can have air guiding elements, which are arranged in such a way that air flowing out of an air outlet side of the hot air duct crosses air flowing out of an air outlet side of the cold air duct.

9 Claims, 8 Drawing Sheets

(56) References Cited

U.S. PATENT DOCUMENTS

| | | |
|---|---|---|
| 8,430,730 B2 | 4/2013 | Feisthammel et al. |
| 8,789,766 B2 * | 7/2014 | Baldauf ................ B64D 13/00 137/3 |
| 2002/0004367 A1 * | 1/2002 | Murai et al. ................... 454/156 |
| 2002/0157811 A1 * | 10/2002 | Vincent ........................... 165/59 |
| 2003/0042011 A1 * | 3/2003 | Vincent .......................... 165/203 |
| 2005/0124284 A1 * | 6/2005 | Newman et al. ............... 454/156 |
| 2005/0159097 A1 * | 7/2005 | Newman et al. ............... 454/156 |
| 2008/0083241 A1 | 4/2008 | Nagata et al. |
| 2008/0210816 A1 * | 9/2008 | Feisthammel et al. ..... 244/118.5 |

FOREIGN PATENT DOCUMENTS

| | | |
|---|---|---|
| DE | 10 2007 048 331 A1 | 4/2008 |
| DE | 10 2007 002 138 A1 | 7/2008 |
| EP | 1 312 493 A2 | 5/2003 |
| EP | 1 344 664 A1 | 9/2003 |
| EP | 1 400 381 A1 | 3/2004 |
| JP | 2008-143514 A | 6/2008 |

* cited by examiner

MIXER FOR MIXING AIR FLOWS

This nonprovisional application is a continuation of International Application No. PCT/EP2012/062473, which was filed on Jun. 27, 2012, and which claims priority to German Patent Application No. DE 10 2011 078 248.6, which was filed in Germany on Jun. 28, 2011, and which are both herein incorporated by reference.

BACKGROUND OF THE INVENTION

1. Field of the Invention

The present invention relates to a mixer for mixing air flows.

2. Description of the Background Art

In order to achieve a correct regulation of the air temperature in a vehicle, effort is made to guide an air flow with colder air and another air flow with warmer air through ducts to the desired outlets. The direction of the flow can be influenced by guiding parts or guiding elements or the colder or warmer air can be blocked as desired.

The effect on the air flow, produced by the individual ducts, guiding parts, and barriers, depends very greatly on the position of the mixing flap(s) while the air is being supplied through a cold air duct and a hot air duct. Therefore, the layering between the inlet or outlet openings of the mixer during the movement of the temperature mixing flap(s) in the mixer is not constant and the temperature increase can be interrupted at some outlet openings. The predominant action of the mixing flaps is the guidance of air and not the mixing thereof and therefore the temperature stratification in the mixer outlet openings is difficult to influence. An automatic regulation of the temperature in the climate control system in this manner proves to be very difficult in the vehicle.

SUMMARY OF THE INVENTION

It is therefore an object of the present invention to provide an improved mixer.

In an embodiment, a mixer for mixing air flows is provided, whereby the mixer can include an air duct, which has at least one hot air duct and one cold air duct, whereby an air flow through the hot air duct and through the cold air duct can be controlled by means of a respective mixing flap, whereby a heating element is arranged in the hot air duct for heating the air passing through the hot air duct; and a mixing chamber, which is fluidically connected to an air outlet side of the hot air duct and of the cold air duct of the air duct, whereby the mixing chamber has air guiding elements, which are arranged in such a way that air flowing out of an air outlet side of the hot air duct crosses air flowing out of an air outlet side of the cold air duct.

An air duct in this case can be understood to be an element that in a number of subducts enables a temperature control of a fluid flowing through the air duct. A mixing chamber can be understood to be a chamber in which air or fluid flows with a different temperature are mixed. A fluidic connection can be understood to be a connection that is permeable to gas and/or fluids. Hereafter, the mixing chamber is also to be understood to be connected as air-permeable to the air outlet side of the air duct. An air guiding element can be understood to be a guiding element such as, for example, a metal strip, which projects into the mixing chamber and is arranged in such a way that it guides a medium flowing through the mixing chamber or a subregion of the mixing chamber, so that it changes its flow direction.

The present invention is based on the realization that an especially good mixing of media with a different temperature can be achieved, when the media flows that have a fluid with a different temperature cross. In this case, a very favorable fluid flow is achieved in which a rapid mixing of the individual partial flows is achieved, without the result of a high stratification of the individual partial flows in the total flow of the fluid or medium. The present invention is further technically simple and therefore cost-effective to produce, so that the noted effects in regard to the good mixability of media or fluid flows can be accomplished at a reasonable cost.

It is especially favorable when according to an embodiment of the present invention the mixing chamber is divided into a plurality of levels by the arrangement of at least one air guiding planar element, whereby the air guiding planar element is oriented in such a way that air flows out of the hot air duct and/or air out of the cold air duct parallel to the at least one air guiding planar element. Such an embodiment of the present invention offers the advantage of a divisibility of the mixing chamber into a plurality of partial mixing chambers with a smaller volume; this occurs particularly through a still better mixing behavior of a mixing chamber configured in this way.

According to further embodiment of the present invention, in the mixing chamber one of the air guiding elements can extend from a region of the air outlet side of the air duct between the hot air duct and the cold air duct to an outlet opening of the mixing chamber, whereby the air guiding element extends only into a subregion of the volume of the mixing chamber, which is provided for guiding an air flow out of the hot air duct. Such an embodiment of the present invention offers the advantage of a greatest possible swirling of the air flow that is guided from the hot air duct into the mixer. A very good mixing behavior can be achieved in this way by the mixer proposed here.

Furthermore, according to another embodiment of the present invention, in the mixing chamber, a further air guiding element can extend from a region of the air outlet side of the air duct between the hot air duct and the cold air duct to an outlet opening of the mixing chamber, whereby the further air guiding element can extend only into a subregion of the volume of the mixing chamber, which is provided for guiding an air flow out of the cold air duct. Such an embodiment of the present invention also offers the advantage of the greatest possible swirling of the air flow that is now guided out of the cold air duct into the mixer. A further improved mixing behavior can be achieved in this way by the mixer proposed here.

In an embodiment, the air guiding element and the further air guiding element can be arranged on opposite walls of the mixing chamber and/or on opposite sides of the air guiding planar elements. In this way, the air guiding elements can produce the most optimal swirling possible through the individual subregions of the mixing chamber.

In order to swirl the largest possible flow volume in a partial mixing region of the mixing chamber, the air guiding element can be arranged on a side of the outlet opening that forms an edge of the outlet opening, which is opposite to the cold air duct.

In order to also swirl analogously the greatest possible flow volume in another partial mixing region of the mixing chamber, a further air guiding element is arranged alternatively or in addition on a side of the outlet opening that forms an edge of the outlet opening, which is opposite to the hot air duct.

According to a further embodiment of the present invention, an outlet opening of the mixing chamber can be smaller than an opening on an inlet side, opposite to the air outlet side of the air duct, of the mixing chamber. Such an embodiment of the present invention offers the advantage of narrowing of the flow cross section for an air flow or a plurality of partial air flows through the mixing chamber, so that when the mixed air flow leaves on the outlet side, a very favorable mixing behavior can be achieved by the mixer.

In order to bring about the lowest possible flow resistance in the mixing chamber, the mixing chamber may have a curved inner wall, which is arranged between an inlet opening, opposite to the air outlet side of the air duct, and the outlet opening.

An especially good adjustability of the temperature of an air flow, which emerges at an outlet opening of the mixing chamber and thus at the outlet opening of the mixer, can then be achieved when the air duct has a mixing flap for controlling an air flow through the cold air duct and a further mixing flap for controlling an air flow through the hot air duct, whereby a position of the mixing flap and a position of the further mixing flap can be controlled separately from one another.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
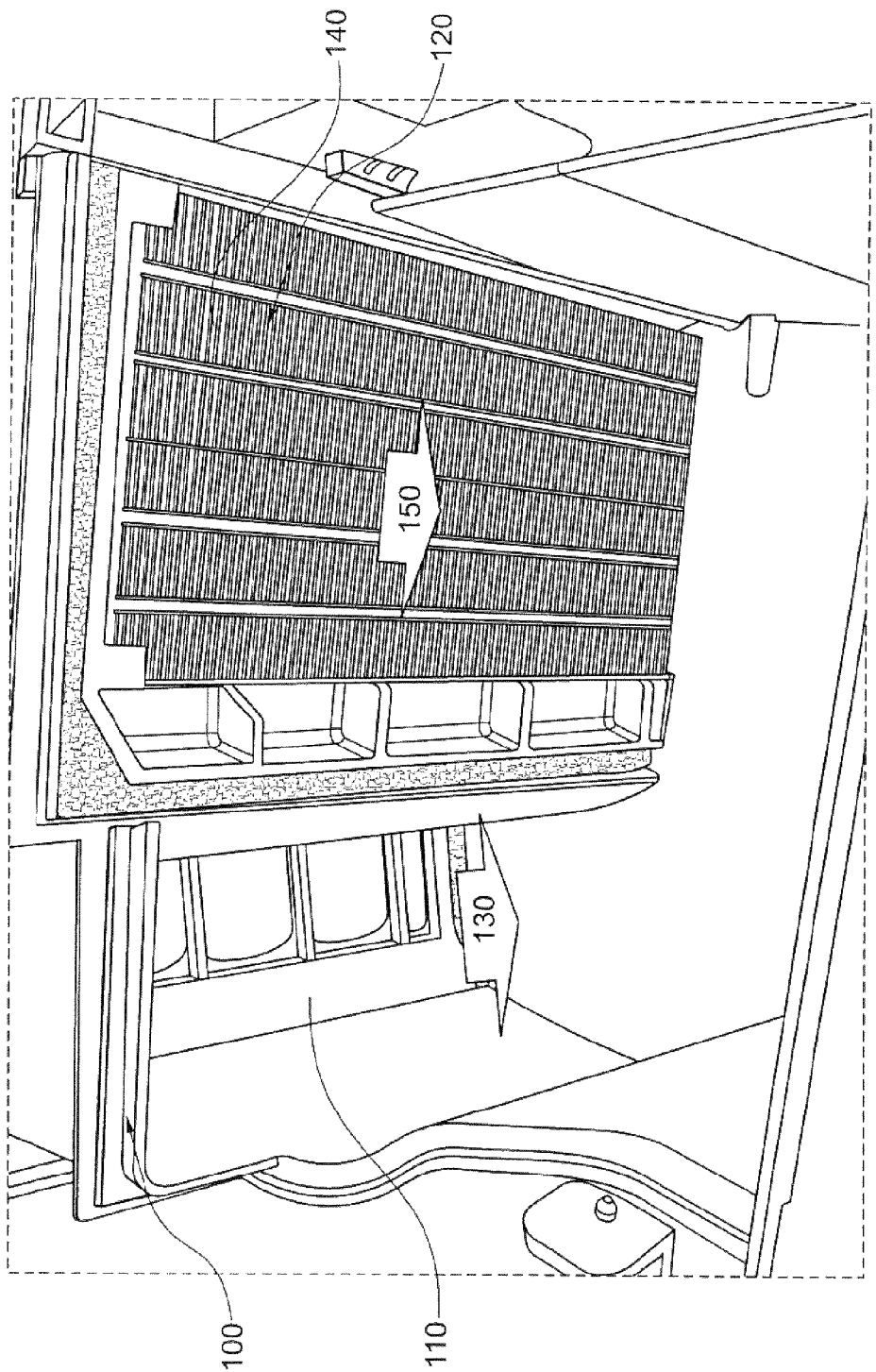
FIG. 1 is a perspective view of an air duct for use in an exemplary embodiment of the present invention.

FIG. 1 shows a perspective view of an air duct 100, which has a cold air duct 110 and a hot air duct 120. Cold air 130 (cooling air) flows through cold air duct 110 during operation of the mixer; this is indicated by an arrow in FIG. 1. Warm air 150 (warming air) flows through hot air duct 120, which, for example, has at least one heating element 140, during operation of the mixer; this is also indicated by an arrow in FIG. 1. In the case of air-side regulated climate control systems (KLA=climate control system), a regulation of colder air flow 130 and warmer air flow 150 is responsible for the temperature regulation at the outlet openings of the climate control system. The weighting of the two flows 130 and 150 is produced by one or more mixing flaps, which are arranged at the air inlet of air duct 100, which in the illustration in FIG. 1 is located on the back of air duct 100 and is therefore not shown in FIG. 1. The temperature at the climate control system openings is regulated by the position (i.e., the opening) of the mixing flaps. The warmer air flow 150 and colder air flow 130 at all flap positions (corresponds to different air distributions) and all mixing flap positions pass and therefore mix uniformly.

A correct temperature regulation may be evaluated according to three criteria:
1. Linearity of the temperature increase with respect to a movement of the mixing flap(s). The increase should be linear and continuous (in all possible positions of the mixing flaps).
2. Temperature layering between outlet openings. The temperature layering is defined by the comfort criteria in the vehicle interior. In this regard, warm air should not emerge only in the air outlet from the dashboard and only cold air from the air outlet in the footwell; rather, a uniformly warm air should emerge at all air outlets.
3. The temperature stratification in each of the air outlets should be as small as possible. This means that at an air outlet no partial air flows if possible arise in which air with a different temperature leaves. The air leaving the air outlets should be mixed beforehand in a mixer unit and be released with a homogeneous, i.e., uniform temperature into the surroundings, particularly into the passenger compartment.

Figure 2:
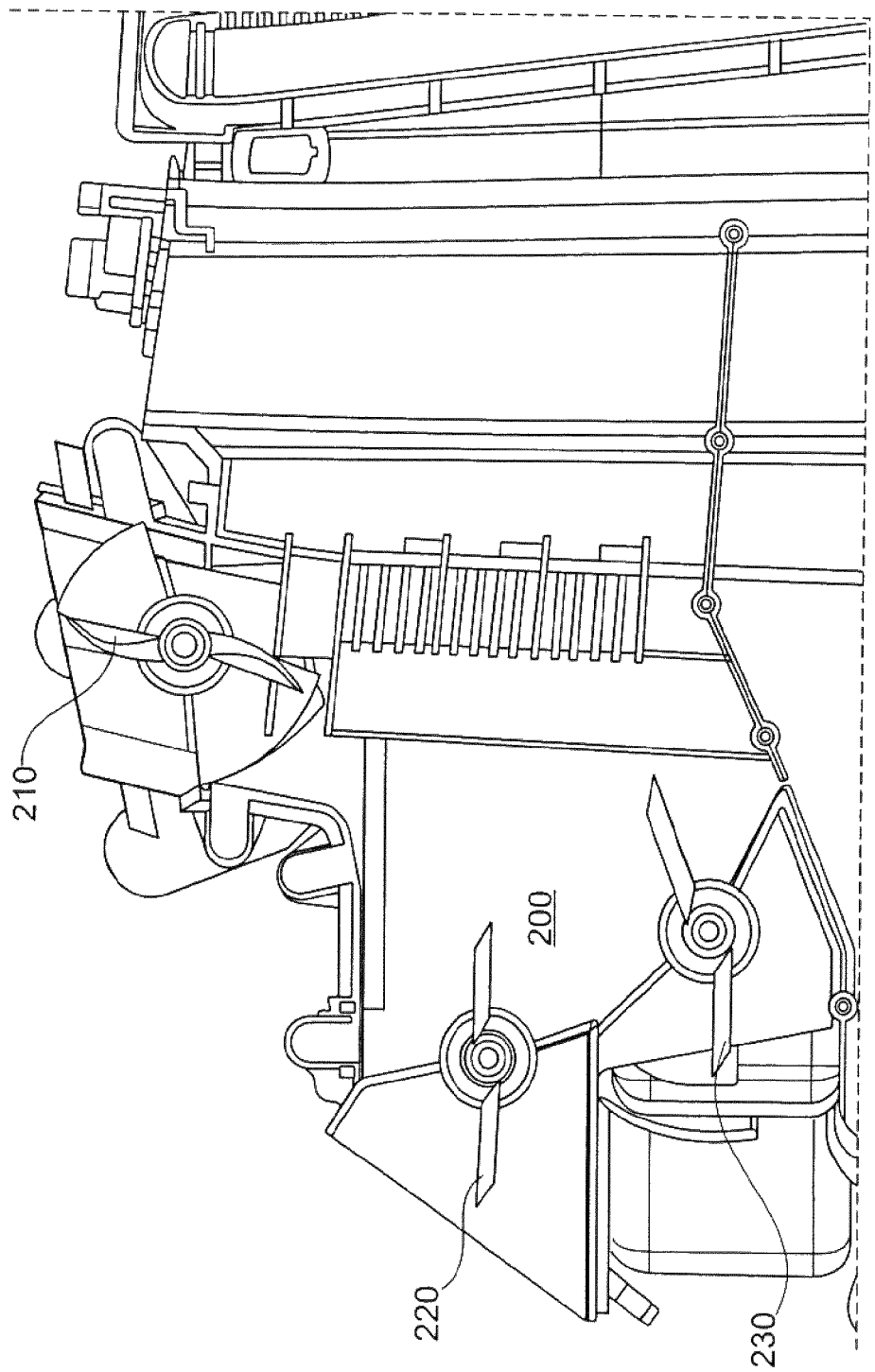
FIG. 2 is a schematic drawing of a mixing chamber and outlet flaps in an air distributor.

For example, the colder and warmer air flows coming from an air duct 100 are mixed in a mixing chamber 200, as is shown in FIG. 2. In this respect, air is supplied via a defrost flap 210 to air duct 100. Temperature-controlled air can be released from mixing chamber 200 via a ventilation flap 220 at an air outlet, for example, in the area of the dashboard. Temperature-controlled air can also be released from mixing chamber 200 via a footwell flap 230 in a footwell of the passenger compartment. Mixing chamber 200 because of installation space limitations in the car is usually too small for proper mixing. Thus, to optimize the air released into the passenger compartment, additional measures should be considered for the proper mixing and conduct of the air.

Figure 3A:
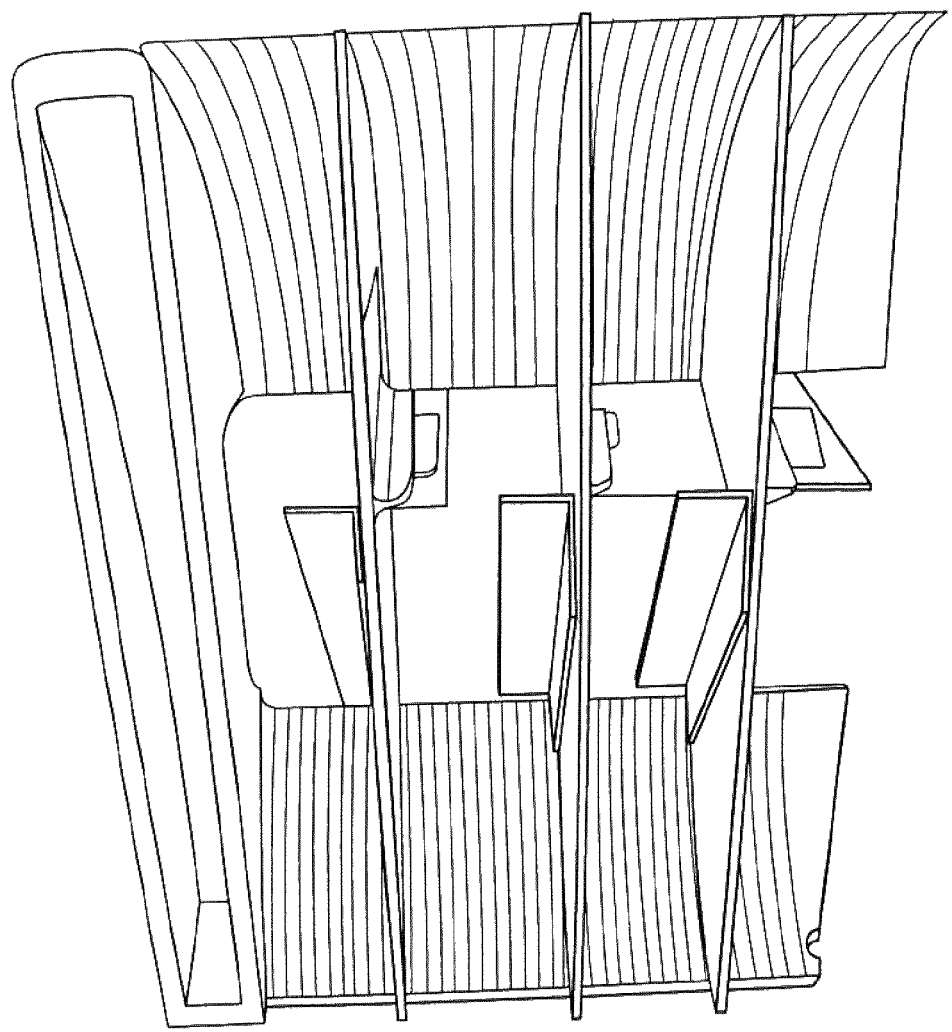
FIG. 3A is a perspective view of a mixing chamber for use in an exemplary embodiment of the present invention, whereby the view is shown with the viewing direction toward the air inlet side in the mixing chamber.
Figure 3B:
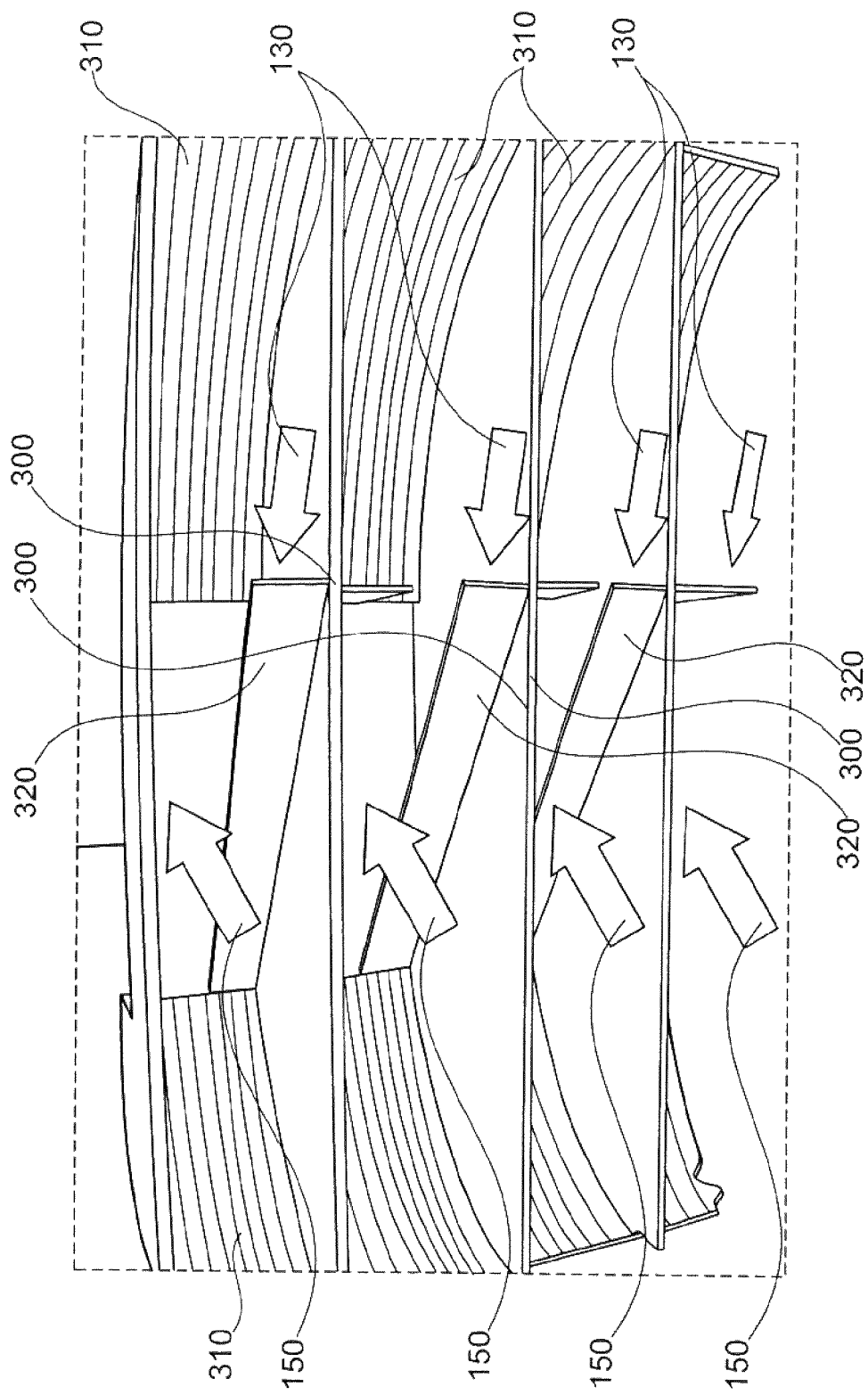
FIG. 3B is an enlarged perspective view of the mixing chamber of FIG. 3A, whereby individual elements are designated in greater detail.

According to an exemplary embodiment of the present invention, mixing chamber 200 is divided into levels by an arrangement of air guiding planar elements 300, as can be seen, for example, from the perspective view in FIG. 3. In this respect, in FIG. 3A a view direction toward the air inlet side of mixing chamber 200 is reproduced, which is shown enlarged in FIG. 3B, whereby in the assembled state said air inlet side of mixing chamber 200 is coupled to an air outlet side of air duct 100 of FIG. 1 and subsequently said air inlet side of mixing chamber 200 is fluidically connected to the air outlet side of air duct 100. Each air guiding planar element 300 (i.e., each level) thus guides a separate cold stream 130 and warm streams 150 through the fluidic connection to cold air duct 110 and the connection to hot air duct 120; said streams are each shown schematically as cold air flow 130 or warm air flow 150 in FIG. 3B. A crossing air flow can be achieved by the crossing warm streams 150 with the corresponding cold streams 130 by side curves of the inner wall 310 of mixing chamber 200 and two fins 320, which cross at different heights in the sublevels; this results in a very good mixing behavior of the air flows with the different temperatures guided through the mixing chamber. Thereby a number of flows which are arranged one behind the other and need clearly less distance for the mutual mixing and for reaching a homogeneous air temperature arise downstream of mixer 100, because in this case many surfaces are available for a heat transfer of the heat from warm streams 150 to cold air streams 130. The division of mixing chamber 200 thereby considerably improves the robustness of the temperature regulation, so that an outlet temperature of the air flow out of the mixer is independent from the air distribution in the mixer.

The height of the fins (i.e., air guiding elements 320) decides the size of the flow and the effect of the crossing. In this regard, air guiding elements 320 extend only in one subregion of the cross section, which is provided for guiding warm air flow 130 in one of the subregions of mixing chamber 200 or a level of mixing chamber 200. Air guiding elements 320 are arranged here on opposite walls of mixing chamber 200 or on opposite sides of air guiding planar elements 300, so that shortly before the outlet each individual warm air flow 150 is guided over or under an air guiding element 320 and each cold air flow 130, contrary to the associated warm air flow 150, is guided under or over a further air guiding element 320, so that the most optimal possible swirling of the warm streams or warm air flow 150 with the associated cold streams or cold air flow 130 occurs. As a result, the most homogeneous possible temperature of the air leaving mixing chamber 200 is achieved. If a target temperature layering value is not necessary, one or more of air guiding planar elements 320 (i.e., one or more levels) can also be omitted.

Figure 4A:
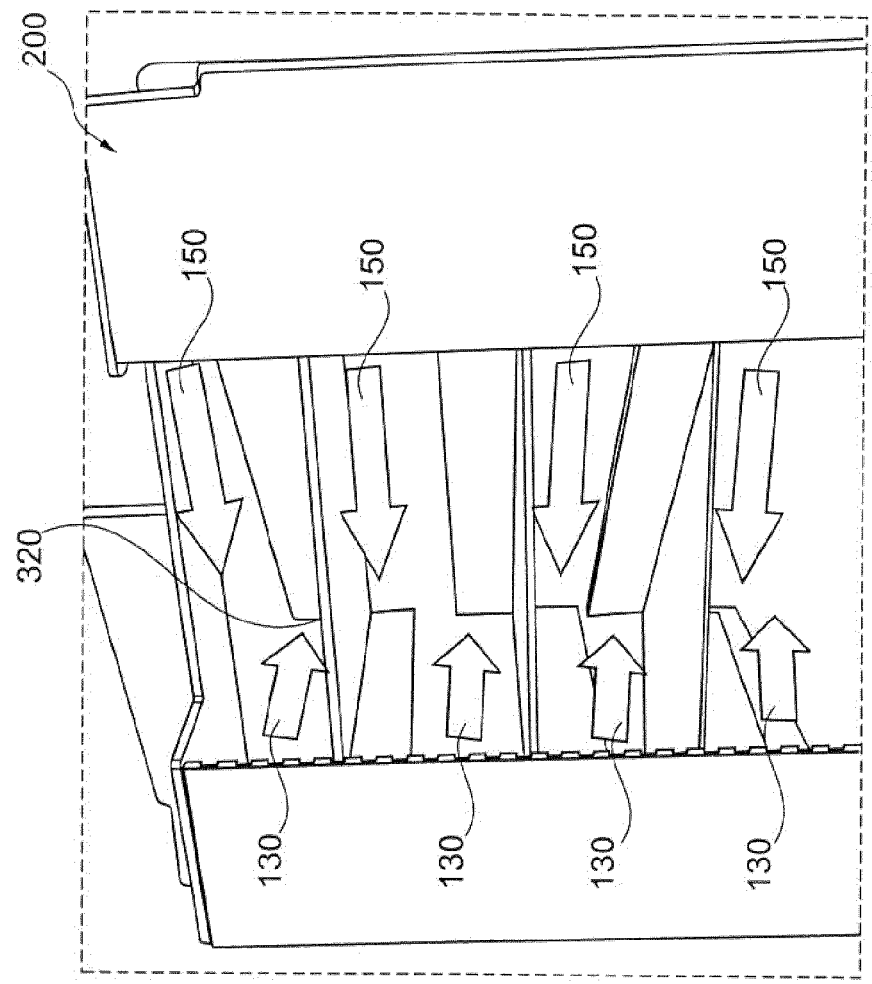
FIG. 4A is a perspective view of a mixing chamber for use in an exemplary embodiment of the present invention.
Figure 4B:
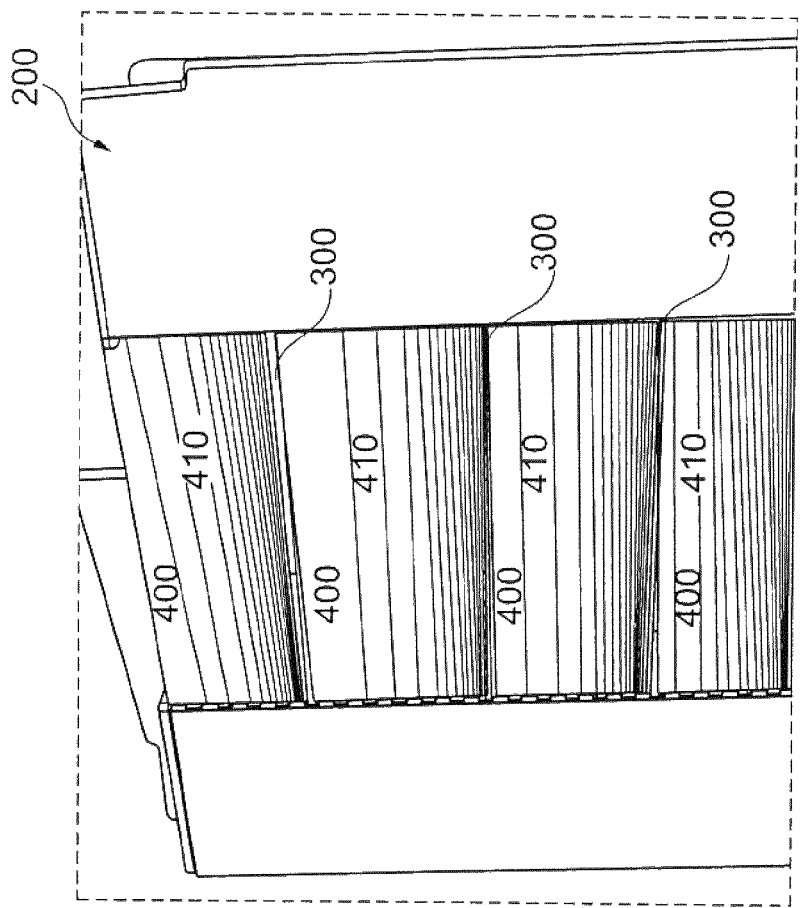
FIG. 4B is an enlarged view of the mixing chamber of FIG. 4A.

A perspective view of mixing chamber 200 from the air outlet side is shown in FIG. 4A, whereby it can be seen how warm streams 150 and the cold streams are guided in the different subregions of mixing chamber 200 by air guiding elements 320, in order to obtain the most homogeneously possible temperature-controlled air at the outlet of mixing chamber 200. A diagram of the distribution of the temperature (i.e., a temperature profile) of the air flows can be seen in FIG. 4B, whereby the region 400 has a temperature of warm streams 150 and region 410 a temperature of cold streams 130. It can therefore be derived from FIG. 4B that on the air outlet side of mixing chamber 200 each of air guiding planar elements 320 on one side has air with a high temperature and at another, opposite side air with a low temperature. Thus, an adjustment of the temperature of cold streams 130 to the temperature of warm streams 150 and vice versa solely by the heat exchange via air guiding planar element 320 can also occur by the use of a thermally conductive material such as metal for air guiding planar elements 320 already in mixing chamber 200.

Figure 5A:
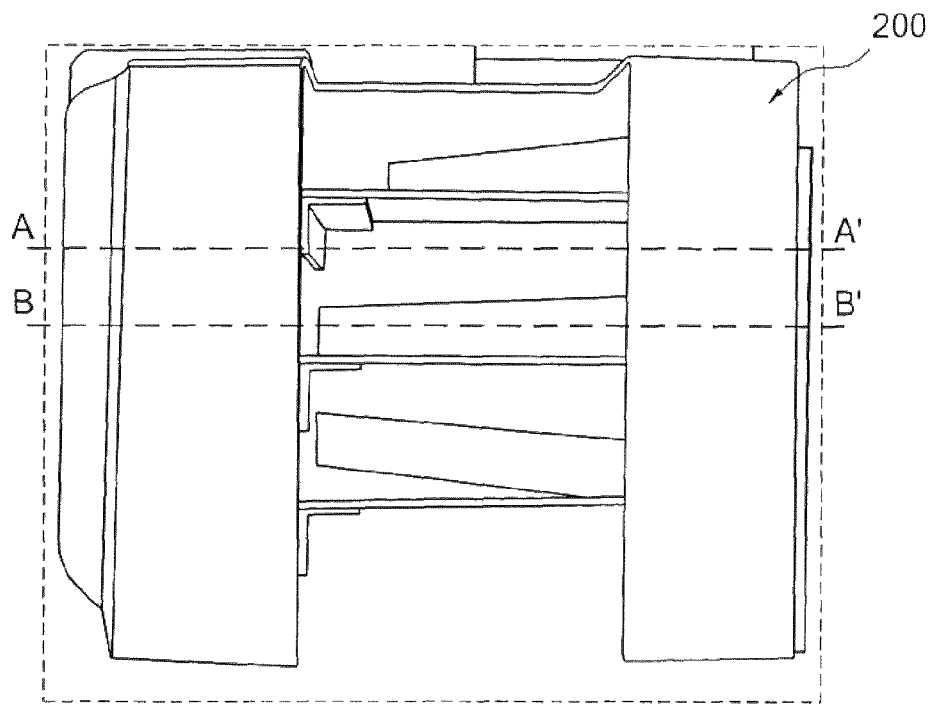
FIG. 5A is a perspective view of a mixing chamber for use in an exemplary embodiment of the present invention, whereby two different cutting planes are shown.
Figures 5B, 5C:
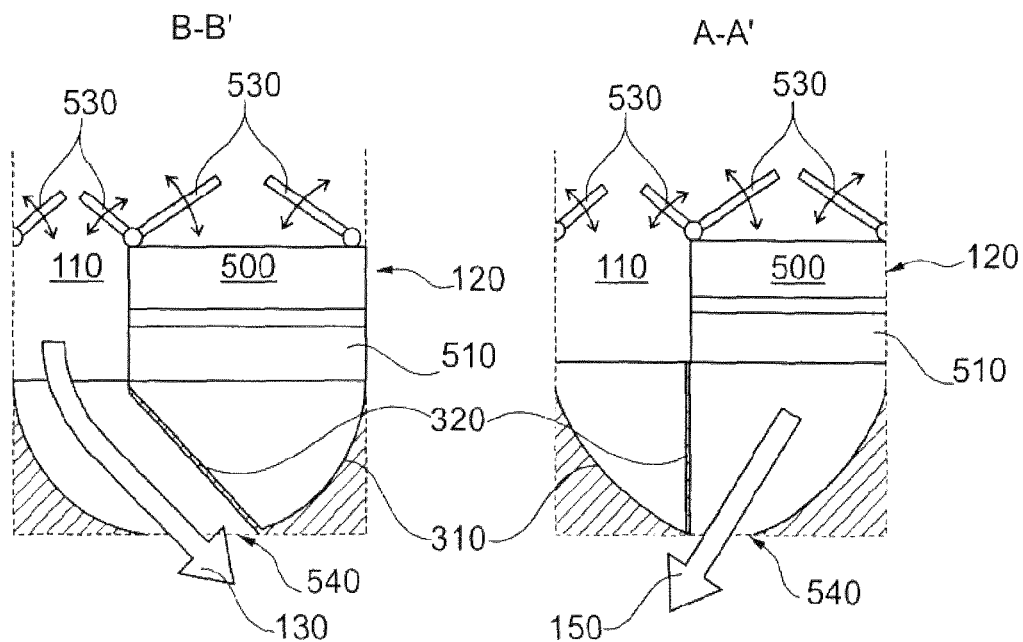
FIG. 5B is a sectional view through the mixing chamber along the cutting plane A-A' of FIG. 5A.
FIG. 5C is a sectional view through the mixing chamber along the cutting plane B-B' of FIG. 5A.

FIG. 5A shows a further perspective view of mixing chamber 200 from the air outlet side. Here, two cutting lines A-A' and B-B' are drawn in the diagram from 5A; these indicate the cutting planes through different heights in mixing chamber 200. A section through the mixing chamber along the cutting line A-A' is shown in FIG. 5B. In this case, air duct 100 with cold air duct 110 and hot air duct 120 can be seen from the sectional view of FIG. 5B. A heater 500 and an electric heating 510, placed downstream of heater 500 in the flow direction, can be seen in hot air duct 120. The inflow of air in cold air duct 110 and in hot air duct 120 is regulated by the positions of mixing flaps 530, each of which releases a maximum air volume through cold air duct 110 or hot air duct 120, whereby mixer flaps 530 of cold air duct 110 can also be called cold flaps and mixer flaps 530 of hot air duct 120 also hot flaps. It is evident further that mixing chamber 200 has a curved inner wall 310 and at the height of cutting line A-A' has an air guiding element 320, which extends from a region of the air inlet side in mixing chamber 200 between cold air duct 110 and hot air duct 120 to a left end of outlet opening 540 of the mixing chamber (i.e., one of the ends of the outlet opening that is closest to the cold air duct). Warm air flow 150, i.e., the warm streams of the air flow from air duct 100 at the height of cutting line A-A' is guided to outlet opening 540. The arrangement of the corresponding elements in FIG. 5B at the height of cutting line B-B' can be seen in the sectional diagram in FIG. 5C. In contrast to the drawing in FIG. 5B, now air guiding element 320 at the height of cutting line B-B' extends from the region between cold air duct 110 and hot air duct 120 to the right end of outlet opening 540, i.e., the one at the end of outlet opening 540 of mixing chamber 200 that is closest to the hot air duct). In the area of outlet opening 540, a crossing air flow from warm stream 150 and cold stream 130 per level is achieved hereby, said crossing air flow which has a considerably more homogeneous air temperature in comparison with an air flow from an arrangement of elements from the state of the art.

Figure 6:
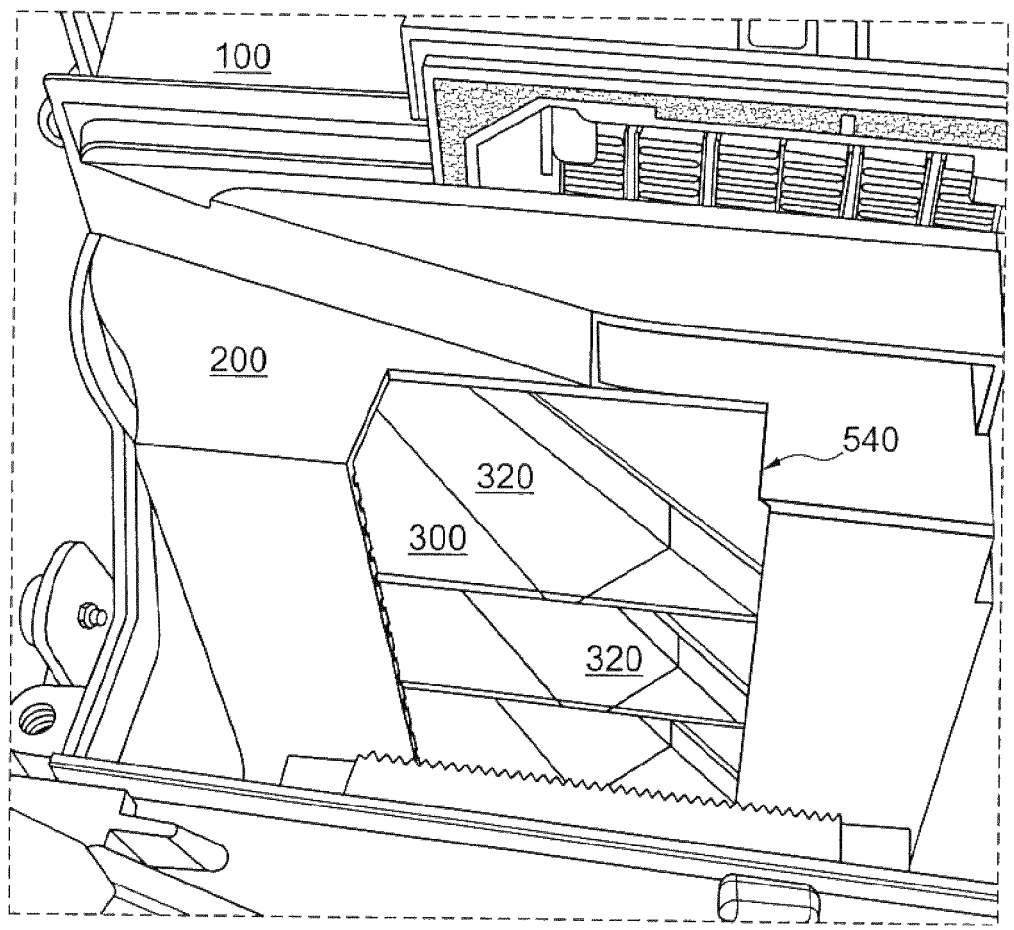
FIG. 6 is a perspective view of a mixer in the assembled state according to an exemplary embodiment of the present invention.

FIG. 6 shows a perspective view of an assembled mixer 100 with an air duct 100 and a mixing chamber 200. In this regard, outlet opening 540 of mixing chamber 200 with a part of air guiding elements 320, arranged in mixing chamber 200, can be seen which bring about the advantageous air guiding of the warm air flow and cold air flow.

It should be noted in summary that an effective air mixing in the case of a low air-side pressure drop is made possible by the use of the mixer presented here. As a result, a considerable improvement of the linearity of the control curves and stratification at the outlets (i.e., the outlet from the mixing chamber) is made possible. Further, this advantage is achieved by a simple and time-saving adjustment of the control curve, whereby this is possible particularly during an optimization of the fin height and the distance between levels. Further, the mixer can be provided as an extra part, which is responsible for the entire temperature regulation, which has logistic advantages. For example, if changes are necessary, only the part can be reworked in which changes have become necessary. Two temperature regulations could be provided also with only one unit and two different mixers, if the climate control system were to be provided for two vehicles with different requirements.

The described exemplary embodiments have been selected only by way of example and can be combined with one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A mixer for mixing air flows, the mixer comprising:
an air duct that has at least one hot air duct and one cold air duct, an air flow through the hot air duct and through the cold air duct is controllable via respective mixing flaps;
a heating element arranged in the hot air duct for heating the air passing through the hot air duct; and
a mixing chamber that is fluidically connected to an air outlet side of the hot air duct and of the cold air duct of the air duct, the mixing chamber having air guiding elements that are arranged such that air flowing out of an air outlet side of the hot air duct crosses air flowing out of an air outlet side of the cold air duct, wherein the mixing chamber is divided into a plurality of levels by the arrangement of at least one flat air guiding planar element;

wherein, in the mixing chamber, one of the air guiding elements extends from a region of the air outlet side of the air duct between the hot air duct and the cold air duct to an outlet opening of the mixing chamber, and wherein the one air guiding element extends only into a subregion of the volume of the mixing chamber, which is provided for guiding an air flow out of the hot air duct, wherein, in the mixing chamber, a further air guiding element extends from a region of the air outlet side of the air duct between the hot air duct and the cold air duct to an outlet opening of the mixing chamber, and wherein the further air guiding element extends only into a subregion of the volume of the mixing chamber, which is provided for guiding an air flow out of the cold air duct, and wherein the one air guiding element and the further air guiding element are arranged on opposing surfaces of one flat air guiding planar element.

2. The mixer according to claim 1, wherein the flat air guiding planar element is oriented such that air flows out the hot air duct and/or out of the cold air duct substantially parallel to the at least one flat air guiding planar element.

3. The mixer according to claim 1, wherein the one air guiding element is arranged on a side of the outlet opening that forms an edge of the outlet opening, which is farthest in a direction of an end of the mixing chamber facing the cold air duct.

4. The mixer according to claim 1, wherein the further air guiding element is arranged on a side of the outlet opening that forms an edge of the outlet opening, which is farthest in the direction of the end of the mixing chamber facing the hot air duct.

5. The mixer according to claim 1, wherein an outlet opening of the mixing chamber is smaller than an opening on an inlet side, opposite to the air outlet side of the air duct of the mixing chamber.

6. The mixer according to claim 1, wherein the mixing chamber has a curved inner wall, which is arranged between an inlet opening opposite to the air outlet side of the air duct and the outlet opening.

7. The mixer according to claim 1, wherein one of the mixing flaps controls an air flow through the cold air duct and a further mixing flap controls an air flow through the hot air duct, and wherein a position of the one mixing flap and a position of the further mixing flap are controllable separately from one another.

8. The mixer according to claim 1, wherein the one flat air guiding planar element extends from one side of the mixing chamber to a second opposing side of the mixing chamber.

9. A mixer for mixing air flows, the mixer comprising:

an air duct that has at least one hot air duct and one cold air duct; and a mixing chamber that is fluidically connected to an air outlet side of the hot air duct and of the cold air duct of the air duct, the mixing chamber having air guiding elements that are arranged such that air flowing out of an air outlet side of the hot air duct crosses air flowing out of an air outlet side of the cold air duct, wherein the mixing chamber is divided into a plurality of levels by at least one flat air guiding planar element;

wherein, in the mixing chamber, one of the air guiding elements extends from a region of the air outlet side of the air duct between the hot air duct and the cold air duct to an outlet opening of the mixing chamber, wherein, in the mixing chamber, a further air guiding element extends from a region of the air outlet side of the air duct between the hot air duct and the cold air duct to an outlet opening of the mixing chamber, and wherein the one air guiding element and the further air guiding element are arranged on opposing surfaces of one flat air guiding planar element.

\* \* \* \* \*